(12) United States Patent
Senarath et al.

(10) Patent No.: US 7,412,254 B2
(45) Date of Patent: Aug. 12, 2008

(54) POWER MANAGEMENT AND DISTRIBUTED SCHEDULING FOR UPLINK TRANSMISSIONS IN WIRELESS SYSTEMS

(75) Inventors: Nimal Senarath, Nepean (CA); Kelvin Kar-Kin Au, Ottawa (CA); Shalini Peliyalwar, Neapean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 648 days.

(21) Appl. No.: 11/012,898

(22) Filed: Dec. 16, 2004

(65) Prior Publication Data

US 2006/0073791 A1 Apr. 6, 2006

Related U.S. Application Data

(60) Provisional application No. 60/615,586, filed on Oct. 5, 2004.

(51) Int. Cl.
*H04B 7/00* (2006.01)
(52) U.S. Cl. .................. 455/522; 455/69; 455/450
(58) Field of Classification Search .............. 455/522, 455/69, 343.4, 450, 512, 524, 525, 54.1, 455/517, 58.1, 13.2, 56.1
See application file for complete search history.

(56) References Cited

U.S. PATENT DOCUMENTS 6,385,198 B1 * 5/2002 Ofek et al. .............. 370/389
6,778,536 B1 * 8/2004 Ofek et al. .............. 370/395.4
2002/0061753 A1 * 5/2002 Lysejko et al. .............. 455/450
2002/0080829 A1 * 6/2002 Ofek et al. .............. 370/539

OTHER PUBLICATIONS

Wireless World Research Forum, WWRF12 Meeting 'The Convergence of Digital Industries' Detailed Programme, Nov. 4-5, 2004, Toronto, Canada.
Senarath, G. et al., Coverage Evaluation Methodology for Next Generation Wireless Systems, WWRF12 Meeting, Nov. 4-5, 2004, Toronto, Canada.
Nokia, 3GPP2 Technical Specification Group C, 1xEV-DV Evaluation Methodology (V13), Nokia 2003.

* cited by examiner

*Primary Examiner*—Tan Trinh

(57) ABSTRACT

To schedule uplink transmission time slots for a collection of mobile. communication devices, a set of base station target interference patterns is associated with base stations. A time slot target interference pattern is assigned for each time slot and it repeats after several time slots. The time slot target interference pattern in a given time slot specifies the interference allowed by each time slot to a given base station by any single mobile. A priority index may be determined for each time slot for each mobile associated with the particular base station. The priority index may be based, in part, on a determined correlation between the time-slot target interference patterns and a potential interference profile of a mobile to which a time slot is to be allocated. A mobile's throughput requirement, the throughput already received over a specified past duration, the system fairness requirement, as well as the amount of data available for transmission are also used for evaluating the priority index.

7 Claims, 7 Drawing Sheets

POWER MANAGEMENT AND DISTRIBUTED SCHEDULING FOR UPLINK TRANSMISSIONS IN WIRELESS SYSTEMS

CROSS REFERENCE TO RELATED APPLICATIONS

The present application claims the benefit of prior application Ser. No. 60/615,586, filed Oct. 5, 2004.

FIELD OF THE INVENTION

The present invention relates to wireless communication systems and, more particularly, to power management and distributed scheduling for uplink transmissions in such systems.

BACKGROUND

For mobile wireless communication devices, many technologies have been developed to obtain and maintain a reliable link with a base station serving the wireless device.

Often, such technologies involve Adaptive Modulation and Coding (AMC). That is, the modulation method and/or data coding method used by mobile wireless communication devices (hereinafter "mobiles") to transmit (uplink) to a base station may be based on indications from the base station of the properties (fading, interference, etc.) of the wireless channel being used for the uplink.

It is known that some of the interference experienced on the channel between the mobile and the base station may be caused by other mobiles communicating with the same base station. As such, scheduling schemes have been developed such that the mobiles in a given sector (i.e., a geographically defined area containing mobiles served by a given base station) transmit data in staggered time slots, as dictated by the base station. Such staggering of transmission times (known as time division multiplexing) allows the mobiles to use more power (and, therefore, a coding level and a modulation level that provide for a higher data rate) when transmitting in a designated time slot without concern for interference with the transmissions of other mobiles in the sector and thereby allows all of the mobiles in the sector to maintain a more robust uplink to the base station. Some systems may allow simultaneous multiple uplink transmissions from a number of mobiles and some of these mobiles may be allowed to use higher power levels, which allow for higher data rates.

In all such cases, higher power uplink transmissions have been seen to excessively interfere with the transmissions of mobiles in adjacent sectors to corresponding base stations depending on the mobile location. Such interference is seen to decrease the overall throughput of the mobile communications system. Although it may seem clear that all that is required to avoid such inter-sector interference is to coordinate scheduling between sectors, such coordination requires a complexity of design that is not favored for future mobile communications system architectures.

In another means of controlling this interference, a given base station provides feedback to each mobile on the total interference measured by the given base station over the noise power (sometimes called "Rise Over Thermal", or "ROT"). Given an ROT target, the interference may be controlled, by instructing mobiles to decrease transmission power level, when the ROT target is exceeded. However, in general, the ROT target is fixed for all the time and it is equal for all the base stations. Unfortunately, some mobiles cannot increase transmission power level beyond a certain level and, as a consequence, these mobiles cannot increase power levels high enough to transmit using certain high data rates.

A large variation in inter-sector interference resulting from variations in time slot use by mobiles in different locations, makes estimation of carrier-to-interference ratio (C/I) in an uplink channel for a given mobile unreliable. In such a case, AMC is usually designed to provide for a large interference margin to avoid channel errors. However, a large interference margin generally lowers the capacity of both the uplink and the downlink.

Since the inter-sector interference cannot be predicted without complex inter-sector coordination, it may be considered difficult to control the fairness of the uplink transmissions. If an equal number of time slots are allocated to each mobile, the throughput of the higher C/I mobiles will be higher than those of lower C/I mobiles. This higher throughput is based on a higher data rate being available to the higher C/I mobiles for transmissions. For example, the known proportionate fair (PF) scheme requires that both "available rate" and the throughput received during the past n number of time slots be used to prioritize mobiles. However, in the PF scheme, those mobiles with a higher available rate are provided with a higher throughput than those mobiles with lower available rates. In addition, large errors in the prioritization mechanism resulting from the errors in C/I estimation used in such a scheme could lead to a fairness different than expected from the PF scheme.

Clearly, improvements are required in power management and scheduling for the uplink portion of mobile communication systems such that both intra-sector and inter-sector interference is controlled, while maintaining fairness.

SUMMARY

A power management and distributed scheduling scheme is used to manage interference in the uplink portion of a mobile communication system. The proposed scheme requires that all the mobiles limit transmission power, according to limits provided to the mobiles by associated base stations, such that the interference level caused by mobiles on neighboring base stations does not exceed a predetermined threshold in specified time slots, thereby reducing fluctuation in uplink interference. A scheduling scheme can then take advantage of the availability of different data rates in different time slots for a given mobile. Advantageously, such a scheduling scheme may allow significant overall capacity gain while supporting diverse Quality of Service requirements.

Further advantageously, both interference avoidance issues and fairness issues may be addressed, efficient QoS support mechanisms may be provided and C/I estimation error may be reduced, which may be seen to lead to overall capacity improvement. More accurate uplink C/I estimation may be seen to allow the use of a weighted prioritization scheme to provide scheduling fairness. Interference avoidance scheduling, in general, provides a way to increase overall capacity significantly because interference caused by the mobiles is controlled.

In accordance with an aspect of the present invention there is provided, at a given base station among a plurality of base stations in a wireless communication system, a method of managing uplink transmission power at a plurality of mobile devices. The method includes selecting a given time slot among a plurality of time slots in a scheduling time frame, determining an interference metric threshold level for the given base station for the given time slot, selecting a given mobile station among the plurality of mobile stations, receiving, from the given mobile station, an indication of a received power level of a pilot signal from the given base station, determining, from the interference metric threshold level and the indication of the received power level, an interference target threshold for the given mobile station and transmitting, to the given mobile station, permission to transmit an uplink transmission to the given base station in the given time slot and an indication of the interference target threshold, whereby a power for the uplink transmission is limited by the interference target threshold. In other aspects of the present invention, a base station is provided for carrying out this method and a computer readable medium is provided for adapting a general purpose computer to carry out this method.

In accordance with another aspect of the present invention there is provided, at a given base station among a plurality of base stations in a wireless communication system, a method of scheduling uplink transmissions among a plurality of mobile wireless communication devices. The method includes selecting a given time slot among a plurality of time slots in a scheduling time frame and, for each mobile wireless communication device in a first subset of the plurality of mobile wireless communication devices, where each mobile wireless communication device in the first subset is associated with the given base station, determining a first priority factor for the given time slot. The determining includes determining a potential interference profile for each mobile wireless communication device in the given time slot, where the potential interference profile includes an estimate of interference that transmissions from each mobile may cause at each base station in a subset of the plurality of base stations and determining a correlation between the potential interference profile and a target interference pattern associated with the given time slot. The method also includes selecting a candidate mobile wireless communication device having an optimum priority index among the mobile wireless communication devices in the first subset of the plurality of mobile wireless communication devices, where the priority index is based, at least in part, on the first priority factor and transmitting a schedule to the candidate mobile wireless communication device, where the schedule indicates that the candidate mobile wireless communication device is permitted to send uplink transmissions to the given base station in the given time slot.

In accordance with a further aspect of the present invention there is provided, at a given base station among a plurality of base stations in a wireless communication system, a method of scheduling uplink transmissions among a plurality of mobile wireless communication devices. The method includes selecting a given time slot among a plurality of time slots in a scheduling time frame and, for each mobile wireless communication device of the plurality of mobile wireless communication devices, determining a potential interference profile for each mobile wireless communication device in the given time slot, where the potential interference profile includes an estimate of interference that transmissions from each mobile may cause at base stations in a subset of the plurality of base stations. The method also includes categorizing the plurality of mobile wireless communication devices into a plurality of categories based on the potential interference profile, associating a category interference profile with each category in the plurality of categories, determining a category priority factor for each category, where the determining the category priority factor includes determining a correlation between the category interference profile associated with each category and a target interference pattern associated with the given time slot, selecting a candidate mobile wireless communication device having an optimum device priority factor among mobile wireless communication devices in a given category of the plurality of categories, where the given category is associated with an optimum category priority factor and where the device priority factor is representative of an urgency to achieve throughput requirements at the candidate mobile wireless communication device, and transmitting a schedule to the candidate mobile wireless communication device, where the schedule indicates that the candidate mobile wireless communication device is permitted to send uplink transmissions to the given base station in the given time slot.

In accordance with an even further aspect of the present invention there is provided a method of assigning base stations to base station groups. The method includes receiving indications of received pilot power levels from a plurality of mobile stations, assigning, based on the pilot power levels, individual mobile stations of the plurality of mobile stations to individual base stations among a plurality of base stations, determining a first mutual interference for a first pair of base stations among the plurality of base stations, where the pair of base stations includes a first base station and a second base station, determining a second mutual interference for a second pair of base stations among the plurality of base stations and, where the first mutual interference exceeds the second mutual interference, assigning the first base station to a first base station group and assigning the second base station to a second base station group.

In accordance with a still further aspect of the present invention there is provided, at a mobile station in a wireless communication system, a method of power management for uplink transmissions to a base station. The method includes receiving a grant of permission to transmit in a given time slot in a scheduling time frame of a plurality of time slots, recording measurements of power in pilot signals received from the base station in the given time slot, receiving an indication of an interference metric threshold level associated, at the base station, with the given time slot, determining, based on the measurements and the interference metric threshold level, an optimum power level for transmission to the base station and transmitting to the base station in the given time slot at the optimum power level.

In accordance with an even still further aspect of the present invention there is provided, at a mobile station in a wireless communication system, a method of power management for uplink transmissions to a given base station among a plurality of base stations. The method includes receiving a grant of permission to transmit in a given time slot in a scheduling time frame of a plurality of time slots, recording measurements of power in pilot signals received from the plurality of base stations in the given time slot, receiving an indication of an interference metric threshold level associated, at each base station in the plurality of base stations, with the given time slot, determining, based on the measurements and the interference metric threshold levels, an optimum power level for transmission to the given base station and transmitting to the given base station in the given time slot at the optimum power level.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
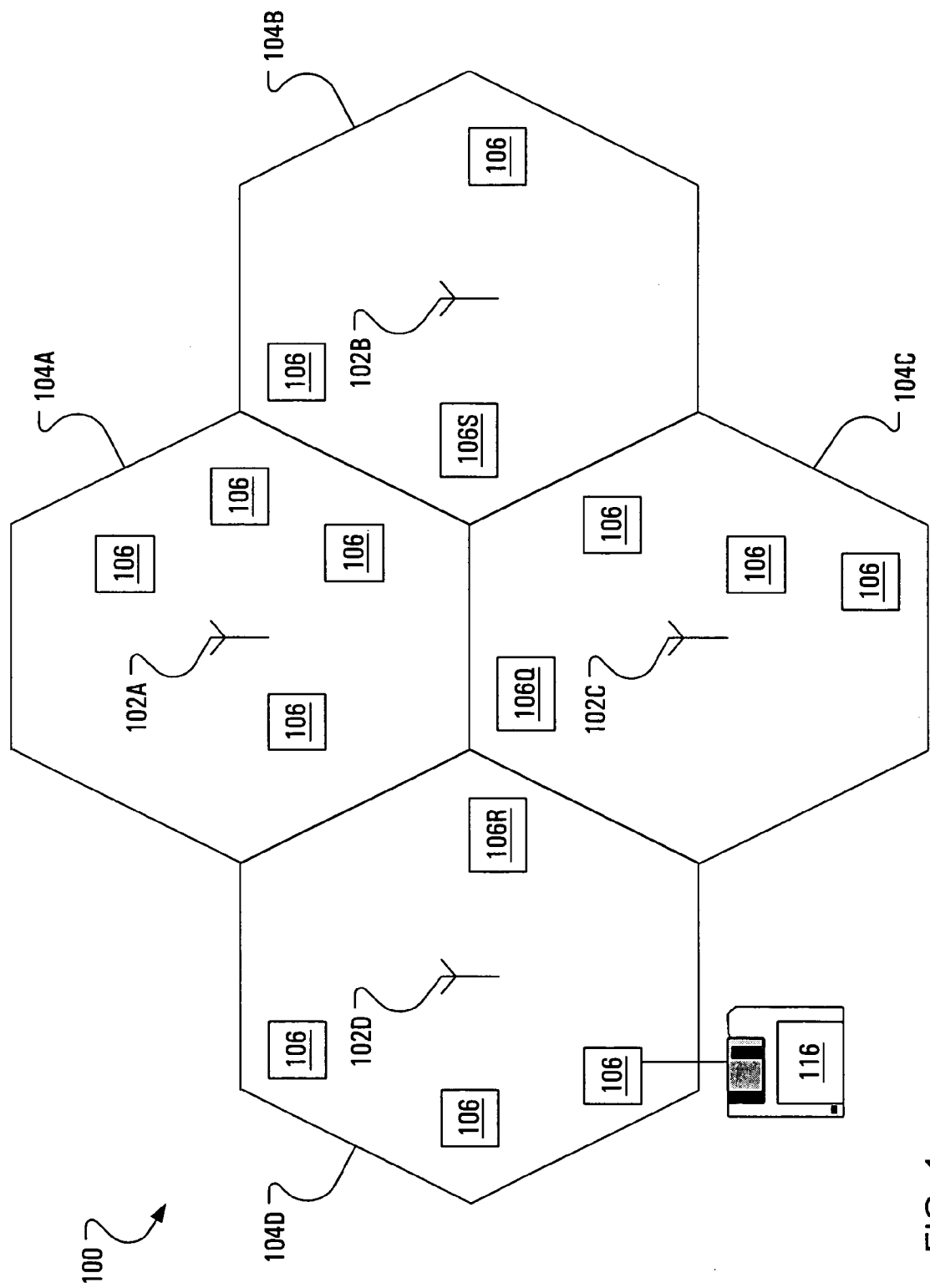
FIG. 1 illustrates an exemplary wireless communication network.

FIG. 1 illustrates a cellular wireless communication network 100 including a first base station 102A, a second base station 102B, a third base station 102C and a fourth base station 102D (individually or collectively 102). Each base station 102A, 102B, 102C, 102D may be considered to define a corresponding first sector 104A, second sector 104B, third sector 104C and fourth sector 104D (individually or collectively 104). Inside each sector 104, mobile communication devices (or "mobiles") 106 are associated with the base station 102 that defines the sector 104. As will be understood by a person of ordinary skill in the art, while the coverage area of a base station 102 is defined as a sector 104 above, the coverage area may, in fact, be divided into multiple sectors.

Mobiles 106 may be loaded with computer executable instructions for executing methods exemplary of aspects of the present invention from a computer readable medium 116, which could be a disk, a tape, a chip or a random access memory containing a file downloaded from a remote source.

Figure 2:
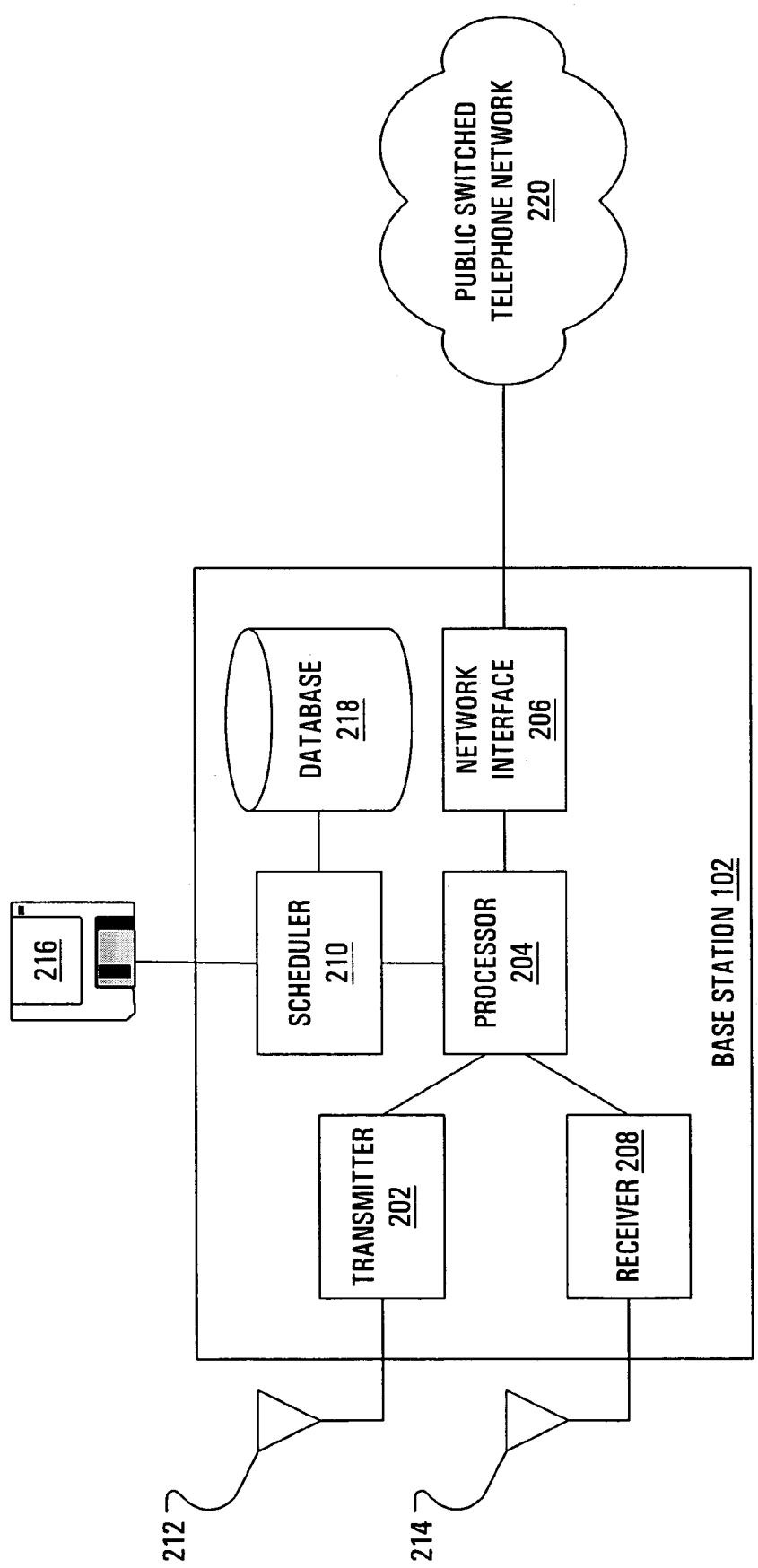
FIG. 2 illustrates a structure for an exemplary base station in the exemplary wireless communication network of FIG. 1.

FIG. 2 illustrates an exemplary base station 102 in detail to include a transmitter 202 and a receiver 208. The transmitter 202 is illustrated as associated with a transmit antenna 212 and the receiver 208 as associated with a receive antenna 214, although it should be clear that the transmit antenna 212 and the receive antenna 214 may be one in the same. A processor 204 connects to both the transmitter 202 and to the receiver 208, as well as to a scheduler 210 and a network interface 206. The network interface 206 connects the base station 102 to a network through which to route signals received from the mobiles 106. An exemplary such network is illustrated as a public switched telephone network (PSTN) 220. However, it should be understood that the base station 102 may connect to many types of networks for voice and data, including the present-day Internet and successors. Additionally, no assumptions are made about the medium used by the network interface 206 to communicate with network through which to route signals received from the mobiles 106. The medium may be, for instance, landline (electrical or optical) or wireless (say, microwave).

In the following, where the transmission of data by a mobile 106 is discussed, it should be understood that the data may include digitized voice.

The scheduler 210 may be loaded with computer executable instructions for executing methods exemplary of the present invention from a computer readable medium 216, which could be a disk, a tape, a chip or a random access memory containing a file downloaded from a remote source.

The scheduler may be in communication with a database 218 of target interference patterns, the necessity for which will be discussed below.

In operation, the base station 102 receives radio signals from the mobiles 106 located in its corresponding sector 104 using the receive antenna 214 directed towards the sector 104. The signals received from mobiles 106 at the receiver 208 are demodulated and information is extracted at the processor 204, which may, for instance, send the information to a destination in the PSTN 220 via the network interface 206. In the other direction, signals received from the PSTN 220 may be modulated at the processor 204 and sent to the mobile 106 by the transmitter 202 via the transmit antenna 212.

In overview, interference avoidance is achieved in a distributed manner using a set of protocols in each base station 102 of the cellular network 100. These protocols define a finite set of orthogonal base station target interference patterns to be associated with each base station 102 in the cellular network 100. The set of orthogonal base station target interference patterns introduces some restrictions to scheduling and power allocations to uplink transmissions by the mobiles 106 associated with each base station 102. These base station target interference patterns describe a manner in which interference metric threshold levels at each base station 102 should vary over a finite number of time slots (a scheduling time frame) and repeat periodically. A time slot target interference pattern may be associated with each time slot, derived from the base station target interference patterns associated with the base stations 102.

The mobiles 106 may be controlled, by instructions from the base stations 102, such that transmissions do not exceed prescribed power levels in the corresponding time slot. In particular, the scheduler 210 may determine select a particular mobile 106 to transmit in a particular time slot. The scheduler may then transmit a schedule to the particular mobile 106 indicating, at least in part, that the particular mobile 106 is permitted to transmit to the base station in the particular time slot.

This indirectly results in a scheme where different Rise Over Thermal (ROT) thresholds (or thresholds for another interference metric) for different time slots are set for each base station 102. Base stations 102 that are sufficiently far apart from each other may be allocated the same base station target interference patterns and may be considered to form a base station group.

A potential interference profile may be generated for each mobile 106. The potential interference profile is the estimated interference a mobile would cause to each base station group. The potential interference profile may be based on mean measured power levels of downlink pilot signals as determined by each mobile 106 and reported to the base station 102. With four base station groups, a potential interference profile may be represented as [X1, X2, X3, X4] and associated with a particular mobile 106 and a particular time slot, where X1 to X4 are normalized interference levels that are estimated to be caused by the particular mobile 106 to the four base station groups, respectively.

Notably, reciprocity is usually applicable between a wireless downlink communication channel and a wireless uplink communication channel. That is, for communication channel degradations known as "path loss" and "Lognormal shadowing", which are known to be significant for wireless communication networks such as the cellular network 100 of FIG. 1, differences between downlink and uplink channels are insignificant.

There is another component of degradation known as "temporal fading", which is not reciprocal for systems using Frequency Division Duplexing (FDD). For the moving mobiles 106, the interference may be averaged over a certain period in order to get an accurate estimation. When the measurements are averaged over a certain minimum time interval, the impact of the temporal fading component is nullified. For systems using Time Division Duplexing (TDD), however, even the temporal adding component can be reciprocal and the interference targets can be evaluated without averaging. The reciprocity and the related averaging impacts are usually known to a person familiar with this art. To benefit from different time slot target interference patterns, in a given time slot, a base station 102 selects a particular mobile 106 for uplink transmission based, in part, on the correlation between the potential interference profile of the particular mobile 106 and the time slot target interference pattern specified for the given time slot.

Depending on the fairness requirements, under-privileged mobiles 106 (i.e., mobiles 106 whose C/I levels are small depending on their specific location) are compensated through the provision, by the base station 102, of additional time slots where the correlation is still sufficiently high.

In addition to indicating at least one time slot during which the mobile 106 is permitted to transmit, the schedule transmitted by the scheduler 210 to the mobile 106 may also indicate a suitable power level for the transmission in that at least one time slot, so that interference from the mobile 106 does not exceed the target interference metric threshold level set for the neighboring base stations 102 in the at least one time slot.

In this manner, a tight control of the potentially strongly interfering mobiles 106 is maintained in a distributed manner, without any need for co-ordination that is central to the entire cellular network 100. The only global reference is the set of orthogonal base station target interference patterns communicated to each of the base stations 102 in the cellular network 100.

The set of orthogonal base station target interference patterns may be communicated to the base stations 102 at the time of deployment or at the time of any other modification in the cellular network 100. Such modifications may include (but are not limited to) installation of a new base station 102, an addition of a new sector or changes in the beam pattern and/or transmit power levels of an existing base station 102. The grouping of base stations 102 can be done using a fixed allocation scheme, by observing geometry or test drive results. The grouping of base stations 102 can also be done based on a self-learning concept by a program that evaluates signal strength reports from individual mobiles and assess grouping and optimum interference targets dynamically. In that case, the base station target interference patterns may be changed in a more regular manner after installation, but after some time it is expected that the interference targets will remain constant.

At the time of deployment of the cellular network 100, a network administrator wishing to employ aspects of the present invention may divide the base stations 102 of the network 100 into base station groups. Such division may be based on the potential for interference. That is, the member base stations 102 of a base station group are selected such that the interference, from mobiles 106 associated with one member base station 102 of a base station group, that reaches another member base station 102 of the same base station group is small. Alternatively, a metric representative of the total interference caused by all the mobiles, or a metric representative of the total interference from a selected few mobiles or any other interference related metric, may be used to group base stations 102. Interference from a particular mobile 106 may not be included in the evaluation of a given base station 102 if the given base station 102 is not one of the base stations 102 to which the particular mobile 106 causes excessive interference. For example, two base stations 102 may belong to the same base station group, if the two member base stations 102 are far apart from each other. The network administrator may then assign a base station target interference pattern to each base station group, where each base station target interference pattern is defined for a predetermined number of time slots (a scheduling time frame). The set of orthogonal base station target interference patterns for all base station groups may then be transmitted to all base stations.

Rather than leaving the grouping of base stations to a network administrator, the grouping may accomplished automatically by a base station controller (not shown). The base station controller is a well known element of a base station subsystem in a cellular network arrangement. Further alternatively, the assignment of base stations into groups may be accomplished by a designated base station 102.

In an exemplary scenario, the base station controller receives indications of received pilot power levels from the mobiles 106. Based on the received pilot power levels, the base station controller assigns individual mobiles 106 to individual base stations 102. The base station controller may determine a first mutual interference the first base station 102A and the second base station 102B and a second mutual interference for the third base station 102C and the fourth base station 102D. Determining the mutual interference may involve evaluating a total interference caused to the first base station by the mobiles 106 assigned to the second base station. Where the first mutual interference exceeds the second mutual interference, the base station controller may assign the first base station 102A to a first base station group and assigning the second base station 102B to a second base station group.

Additionally, a per-mobile transmission power limit, T(j, n), may be specified for the jth mobile and time slot n and transmitted to the jth mobile. The jth mobile is then expected to transmit with a power not exceeding T(j, n) in time slot n. In different time slots, different transmission power limits are provided.

Although an increase in the transmit power of a given mobile 106 allows for an increase in the data rate of the given mobile 106, such an increase in the transmit power may, due to interference, reduce the potential transmission rates of other mobiles 106. The impact of interference from uplink transmissions from a first mobile 106R to the fourth base station 102D on uplink transmissions from a second mobile 106Q to the third base station 102C depends on the power level of the uplink transmission received at the third base station 102C and noise plus total interference (N+I) received at the third base station 102C. It is desirable to increase the transmission power of the interfering (first) mobile 106R until resultant interference at the third base station 102C is equal to N+I. There are many such favorable scenarios where power increase or decrease provides an overall gain depending on the operating point.

As is known, a base station 102 typically includes a pilot signal in each time slot of downlink transmissions to associated mobiles 106. Each mobile 106 receives the downlink transmissions from an associated base station 102 as well as from other base stations 102. Each mobile 106 may measure and record the received power level in each pilot signal in each time slot. A predetermined number of measurements may be recorded such that a mean measured power level may be determined and associated with each base station 102 for each time slot. The mean measured power level in the pilot signals having a predetermined number, M, of the highest mean measured power levels is reported to the associated base station 102 for each time slot.

Using FIG. 1 for example, in a given time slot, a given mobile 106S in the second sector 104B associated with the second base station 102B may receive and measure pilot signals from the first base station 102A, the second base station 102B, the third base station 102C and the fourth base station 102D. The mean measured power level may be greatest in the pilot signal received from the second base station 102B, next greatest in the pilot signal received from the first base station 102A, next greatest in the pilot signal received from the third base station 102C and least in the pilot signal received from the fourth base station 102D. It may be predetermined that the given mobile 106S will report the top three (i.e., M=3) mean measured pilot signal power levels. As such, the mean measured power level of the pilot signal from the first base station 102A, the second base station 102B and the third base station 102C may be reported to the second base station 102B, i.e., to the base station with which the given mobile 106S is associated.

Figure 3:
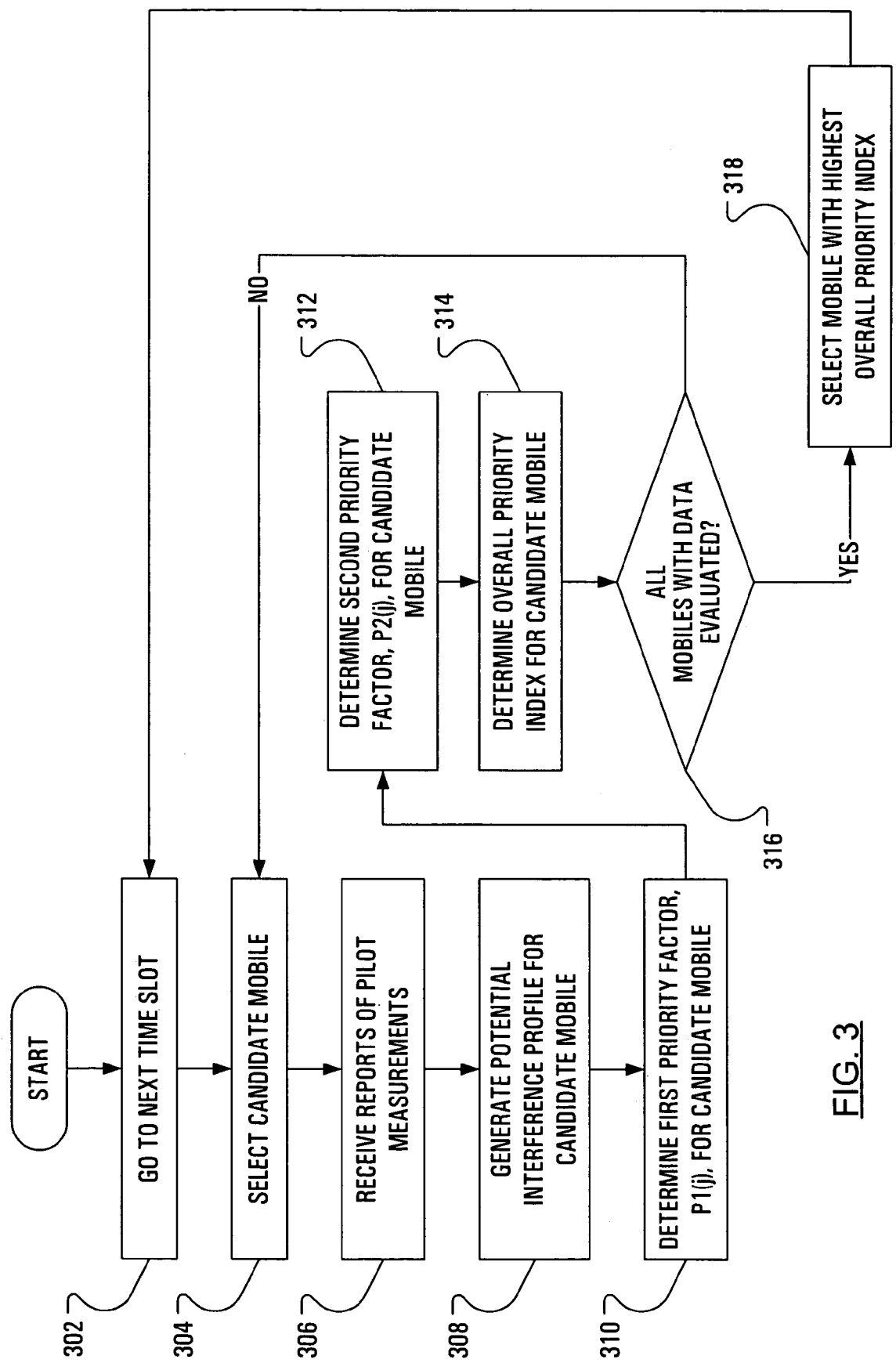
FIG. 3 illustrates steps in a method of allocating a mobile to a given time slot; according to an embodiment of the present invention.

FIG. 3 illustrates steps in an exemplary method of time-slot allocation performed by the scheduler 210. Initially, a time slot may be selected (step 302). It should be clear that the time slots are organized in a "scheduling time frame" having a predetermined number of time slots. In the exemplary method of FIG. 3, each time slot is considered in order from the first time slot through to the last time slot of the scheduling time frame, at which point the first time slot in the scheduling time frame is then selected. In the example scheme, the size of the scheduling time frame is equal to the number of base station target interference patterns available in the system. Subsequently, a candidate mobile 106 may be selected (step 304) from a pool of mobiles. The reports of the mean measured power levels of downlink pilot signals are received (step 306) by the base station 102 for each mobile 106 associated with the base station 102 at which the scheduler 210 is located. The mean measured power levels of the pilot signals may be used by the scheduler 210 to generate a potential interference profile for the candidate mobile 106 (step 308). The potential interference profile of the candidate mobile 106 may be considered to provide an indication of a likely received power level (i.e., a potential level of interference) for each of the various base stations 102.

The scheduler 210 may then determine (step 310) a first priority factor, P1(j), representative of the suitability of the time slot selected in step 302 to control interference from the candidate mobile 106, selected in step 304. In general, to determine the first priority factor, P1(j), for a jth mobile 106, a correlation is determined between the potential interference profile of the jth mobile 106 and the time slot target interference pattern of the selected time slot. The time slot target interference pattern of the selected time slot may be obtained by a query to the database 218. Alternatively, a query to the database 218 may provide base station target interference patterns from which the time slot target interference pattern may be derived.

For a given time slot, a first mobile may be given a higher first priority factor than a second mobile when the correlation of the potential interference profile of the first mobile with the time slot target interference pattern of the selected time slot is higher than the correlation of the potential interference pattern of the second mobile with the time slot target interference pattern of the selected time slot.

The scheduler 210 may then determine a second priority factor, P2(j), representative of an urgency to achieve Quality of Service (e.g., throughput) requirements, for the candidate mobile 106 (step 312). For example, the second priority factor, P2(j), for the jth mobile 106, may be based on a measure of the throughput received by the candidate mobile 106 over the last n time slots, a measure of data in the input buffer of the candidate mobile 106, contractual requirements or throughput fairness requirements.

In an exemplary case, the second priority factor, P2(j), may be determined as the inverse of a normalized throughput value, where the normalized throughput value may be formed by dividing an individual throughput for the jth mobile 106 by a mean throughput of the home base station 102. This throughput requirement may be evaluated over a certain specified duration (for example, the last few seconds).

Throughput fairness requirements may depend on the application that is executed on the candidate mobile 106. The candidate mobile 106 will, generally, have a Service Level Agreement (SLA) with the operator that specifies a minimum throughput. The minimum throughput may be specified associated with an application or as a general requirement. For example, in the known 1×RTT system, a minimum throughput of 9.6 kbps is specified for certain types of applications (e.g., FTP).

An overall priority index may then be determined for the candidate mobile by multiplying the first priority factor and the second priority factor (step 314). It may then be determined (step 316), by the scheduler 210, whether all mobiles 106 with data have been evaluated for suitability to the selected time slot. If all mobiles 106 with data have not been evaluated, a new candidate mobile may be selected (step 304) and an overall priority index may be determined for the new candidate mobile. If all mobiles 106 with data have been evaluated, the mobile having the greatest priority index may then be selected (step 318) for the selected time slot.

The scheduler 210 may then grant the selected mobile 106 permission to transmit in the given time slot. The scheduler 210 may also determine an optimum power level (an interference target threshold) for uplink transmission by the selected mobile 106 and may indicate the optimum power level to the selected mobile 106. The determination of the optimum power level may be based on a maximum allowed per-mobile interference metric threshold level associated with the selected time slot and the reported mean measured power levels of the pilot signals. The granting of permission to the selected mobile 106 to transmit in the given time slot and the indication of the optimum power level may be accomplished by transmitting a schedule to the selected mobile 106.

Instead of time slot by time slot selection, the scheduler 210 may grant, to a selected mobile, permission to transmit in a batch of time slots by evaluating the priorities for those time slots ahead of time using past measurements. Once a mobile has been selected and granted permission to transmit in the selected time slot, the next time slot in the scheduling time frame may be selected (step 302) and the method steps of FIG. 3 may be repeated.

Advantageously, in the event that the data of a previously selected mobile requires more than one time slot, the previously selected mobile may remain in the pool of mobiles from which a candidate mobile is selected in step 304. As such, where the overall priority index of the previously selected mobile is highest for the currently selected time slot, the previously selected mobile may be selected again (in step 318) and may be granted permission to transmit in the currently selected time slot.

Figure 4:
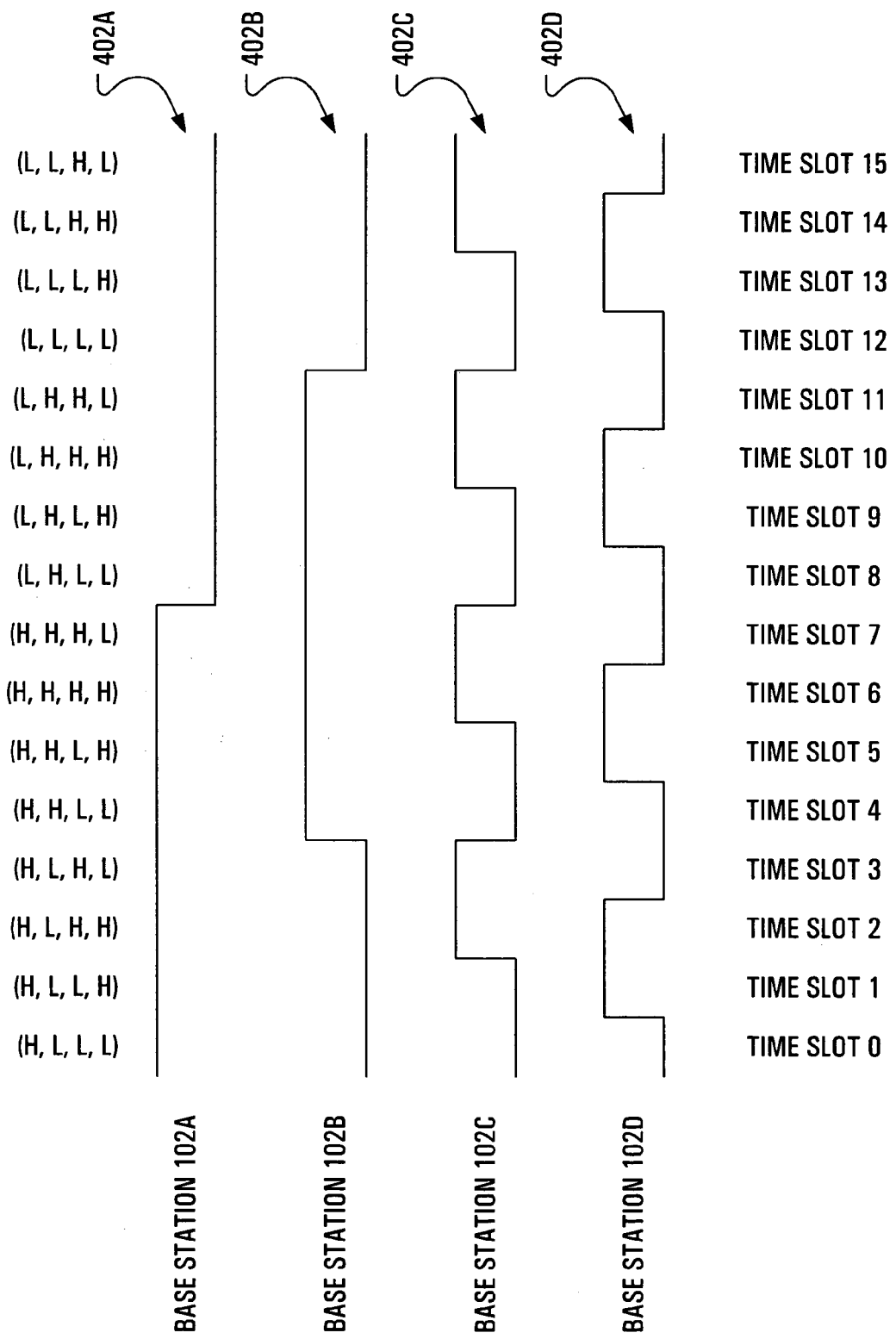
FIG. 4 illustrates exemplary target interference patterns for the base stations of the exemplary wireless communication network of FIG. 1.

FIG. 4 illustrates exemplary base station target interference patterns for a wireless communication network employing two interference metric threshold levels and four groups of base stations 102. In particular, FIG. 4 illustrates a first exemplary base station target interference pattern 402A for a first base station group including the first base station 102A of FIG. 1, a second exemplary base station target interference pattern 402B for a second base station group including the second base station 102B, a third exemplary base station target interference pattern 402C for a third base station group including the third base station 102C and a fourth exemplary base station target interference pattern 402D for a fourth base station group including the fourth base station 102D. The exemplary base station target interference patterns (individually or collectively 402) are presented for a scheduling time frame having 16 time slots, labeled time slot 0 through time slot 15. The number, 16, of time slots in the scheduling time frame may be considered to be determined from the number, two (H, L), of interference metric threshold levels and the number, four (first, second, third, fourth), of base station groups ($2^4$=16).

The interference metric on which the threshold levels are based may be, for instance, a value of the known parameter "rise over thermal". In a time slot wherein the interference metric threshold level is "H", a relatively large amount of interference from mobile stations 106 associated with neighboring base stations 102 is allowed.

Also presented in FIG. 4 are exemplary time slot target interference patterns for individual time slots. The exemplary time slot target interference patterns for time slots may be determined from the exemplary base station target interference patterns 402 for base stations 102. Where the first exemplary base station target interference pattern 402A for the first base station 102A may be expressed as (H, H, H, H, H, H, H, H, L, L, L, L, L, L, L, L), the exemplary time slot target interference pattern for time slot 11 may be expressed as (L, H, H, L). The exemplary time slot target interference pattern for time slot 11 may interpreted by each base station 102 to indicate that a mobile station 106 should be selected that may be expected to interfere more heavily with the second base station 102B and the third base station 102C than with the first base station 102A and the fourth base station 102D.

In an exemplary case, where time slot 4 with a time slot target interference pattern of (H, L, H, L) is selected (see step 302, FIG. 3), the jth mobile station, with a normalized potential interference profile of (0.74, −1.0, 0.5, −1.0), may be determined, by the first base station 102A with which the jth mobile station may be associated, to have the highest first priority factor P1(j, 4).

It may be considered that the rise over thermal threshold level, H, corresponds, at the first base station 102, to normalized rise over thermal value of 1.0. Based on the normalized potential interference profile, it may be considered that a normalized uplink transmission power level of 1.0 at the jth mobile station leads to a received normalized power level of 0.74 at the first base station 102. Accordingly, the first base station 102 may indicate to the jth mobile station an optimum power level of 1.35 so that the normalized received power from the jth mobile station is around 1.0.

Mobiles 106 associated with a given base station 102 may be categorized according to the potential interference profile associated with each mobile.

Figure 5:
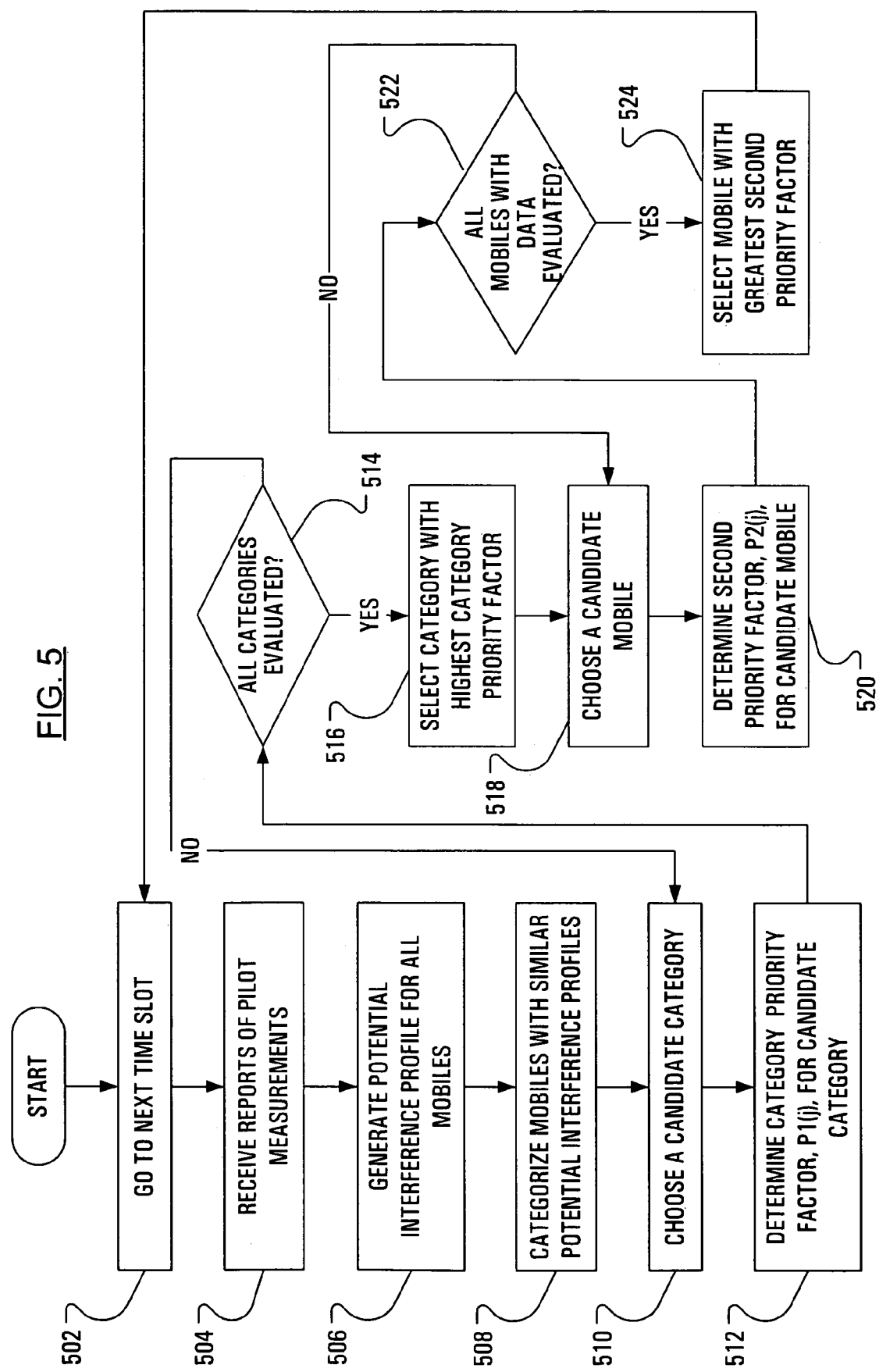
FIG. 5 illustrates steps in a method of allocating a mobile to a given time slot; according to an embodiment of the present invention as alternative to the method of FIG. 3.

FIG. 5 illustrates steps in an exemplary method of time-slot allocation performed by the scheduler 210, as an alternative to the method of FIG. 3. Initially, a time slot may be selected (step 502). Subsequently, reports of the mean measured power levels of pilot signals are received (step 504) from the mobiles 106 associated with the base station 102 at which the scheduler 210 is located. The mean measured power levels of the downlink pilot signals are used by the scheduler 210 to generate a potential interference profile for each mobile 106 (step 506). The potential interference profiles may then be used by the scheduler 210 to categorize (step 508) the mobiles according to potential interference profile, where mobiles 106 having the same or similar potential interference profiles are associated with the same category.

A candidate category may then be chosen (step 510) from among the categories with which the mobiles 106 have been associated. The scheduler 210 then determines (step 512) a category priority factor representative of the suitability of the time slot selected in step 502 to control interference from a mobile 106 in the candidate category, chosen in step 510. To determine the category priority factor for the a given category, a correlation is determined between the potential interference profile of the given category and the time slot target interference pattern of the selected time slot. The time slot target interference pattern of the selected time slot may be obtained by a query to the database 218.

It may then be determined (step 514), by the scheduler 210, whether all categories have been evaluated for suitability to the selected time slot. If all categories have not been evaluated, a new candidate category is chosen (step 510) and a first priority factor is determined for the new candidate category. If all categories have been evaluated, the category having the greatest first priority factor is then selected (step 516). A candidate mobile 106 may then be chosen (step 518) from the category selected in step 516. The scheduler 210 may then determine a second priority factor, P2(j), representative of an urgency to achieve throughput requirements, for the candidate mobile 106 (step 520). The second priority factor, P2(j), for the jth mobile 106, may be based on a measure of the throughput received by the candidate mobile 106 over last n time slots, a measure of data in the input buffer of the candidate mobile 106, contractual requirements and throughput fairness requirements.

It may then be determined (step 522), by the scheduler 210, whether all mobiles 106 in the selected category have been evaluated for suitability to the selected time slot. If all mobiles 106 in the selected category have not been evaluated, a new candidate mobile 106 is chosen (step 518) and a second priority factor is determined for the new candidate mobile 106. If all mobiles 106 in the selected category have been evaluated, the mobile 106 having the greatest second priority factor is then selected (step 524) for the selected time slot.

Alternatively, as a sub optimal solution, different possible categories of interference profiles could be identified, which categories of interference profiles map to each time slot a priori. Then, steps 510, 512 and 514 may be skipped, since a category can be directly mapped to a time slot. Then, a mobile is selected according to steps 518, 520, 522 and 524 by evaluating the second priority index only for the mobiles belong to that category.

The scheduler 210 may then grant the selected mobile 106 permission to transmit in the given time slot. The scheduler 210 may also determine an optimum power level for uplink transmission by the selected mobile 106 and indicate the optimum power level to the selected mobile 106. The determination of the optimum power level may be based on a maximum allowed per-mobile interference metric threshold level associated with the selected time slot and the reported mean measured power levels of the pilot signals.

Once a mobile has been selected and granted permission to transmit in the selected time slot, the next time slot in the scheduling time frame may be selected (step 502) and the method steps may then be repeated.

By assigning suitable time slots to mobiles 106, it is expected that all the sectors 104 will function in a favorable operating scenario most of the time. This favorable operating scenario may be achieved when all of the interfering mobiles 106 comply with the requirements provided by the scheduler 210 in the associated base station 102.

Advantageously, where the uplink transmissions of some mobiles 106 associated with the first base station 102A and the third base station 102C are known to have the potential to interfere heavily with the uplink transmissions from some mobiles 106 in the second sector 104B to the second base station 102B, aspects of the present invention allow for mobiles that are known to interfere highly with uplink transmissions to the second base station 102B to be allocated the time slots in which a higher interference metric threshold level at the second base station 102B is allowed.

Advantageously, if a fixed interference metric threshold level is assumed for all the time slots, some mobiles (that interfere heavily with some base stations) may not be allowed to exceed their optimum power levels to achieve a higher rate, because the mobiles would exceed the allowed interference at other base stations. A "grace" time slot may be given by a base station 102 to a mobile 106, such that, in the grace time slot, the fixed interference metric threshold level is allowed to be exceeded to a predetermined higher level, then all the mobiles 106 can exceed the interference to that particular base station 102 without impacting the base station's transmissions further. If a first interfering mobile 106 exceeds the fixed interference metric threshold level, increasing the interference by other mobiles 106 would not impact total interference of the particular base station 102 until a second interfering mobile 106 increases the interference closer to the first interfering mobile 106.

Figure 6:
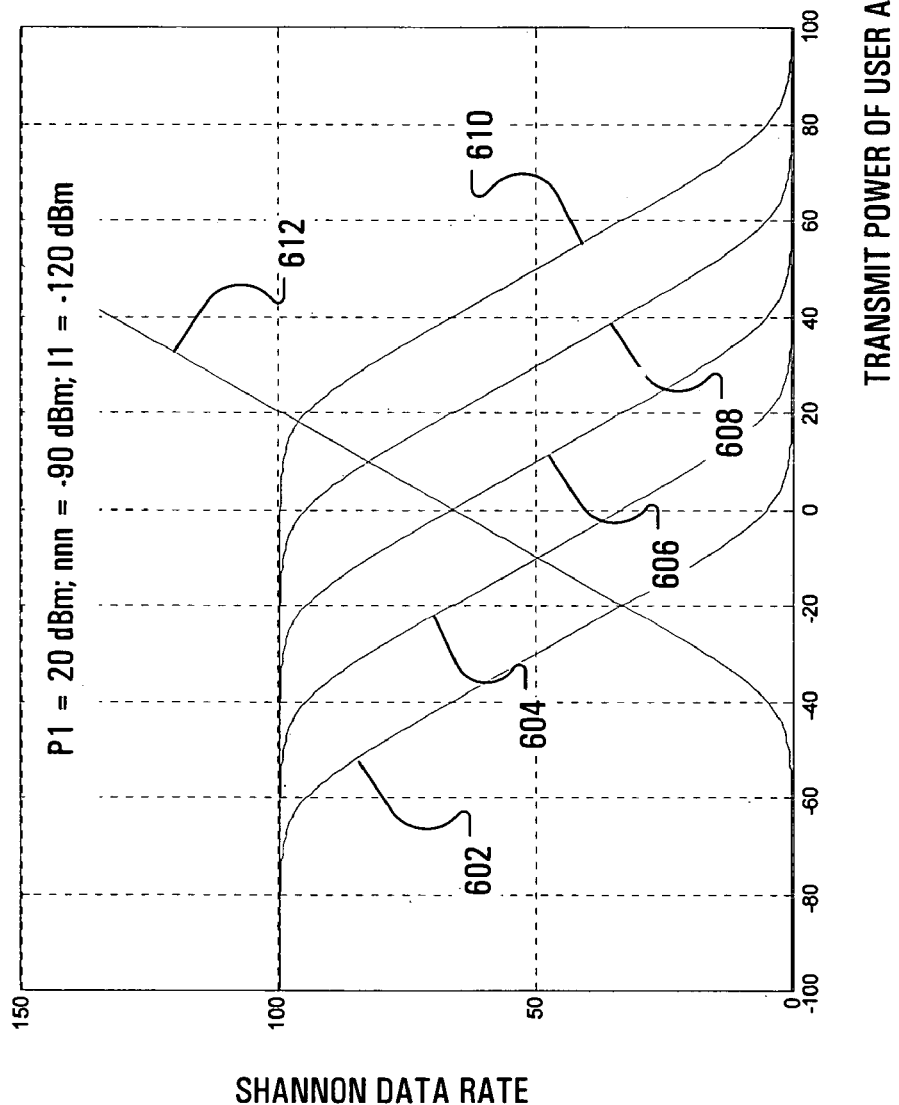
FIG. 6 illustrates a relationship between a data rate of a transmission at a first mobile as a function of a transmission power of a second mobile, for several pre-existing interference levels at the first mobile.

FIG. 6 illustrates a first curve 602, a second curve 604, a third curve 606, a fourth curve 608 and a fifth curve 610. The curves 602, 604, 606, 608, 610 may be considered to provide an indication of the impact of the transmit power of a mobile "A", on the x-axis, on the uplink data rate of a mobile "B", on the y-axis, when mobile B is already subject to interference (I) from other mobiles. The first curve 602 is associated with an I of −80 dBm. The second curve 604 is associated with an I of −60 dBm. The third curve 606 is associated with an I of −40 dBm. The fourth curve 608 is associated with an I of −20 dBm. The fifth curve 604 is associated with an I of 0 dBm. A sixth curve 612 shows how the data rate of mobile A changes with the transmit power level of mobile A, assuming that the interference level experienced by mobile A remains constant. It can be seen that, until the interference caused by mobile A reaches I, there is no impact from a transmit power increase at mobile A on the other mobiles' data rates. Therefore, when the value of I is large (the fifth curve 610), the transmit power of mobile A can be increased to a larger value (and, therefore, mobile A can transmit at a higher data rate) without impacting other user's transmissions. Therefore, the low C/I users can take advantage of the "grace" time slots described above. On the other hand, mobile A can get only a negligible rate increase by increasing its own power until its power reaches the total interference (e.g., the sixth curve 612).

Additionally advantageously, the priority factor determining mechanism (steps 310 and 312, FIG. 3) that may be established for the schedulers 210 of each of the base stations 102 may be considered to function in a distributed manner in each sector 104 such that any variation of throughput within a sector 104 can be controlled while implementing scheduling and power management practices exemplary of aspects of the present invention.

Since the fluctuation in the interference level experienced by uplink transmission from each mobile 106 may be considered to be reduced through use of aspects of the present invention, C/I levels may be estimated much more accurately than when round robin scheduling is employed. Therefore, the capacity of the uplink channel for each mobile 106 may be considered to have been increased. Current studies indicate that C/I estimation errors can cause significant loss of capacity.

Preliminary simulations have shown that, with two target interference metric threshold levels and four base station groups, the number of mobiles 106 that can be supported with a particular throughput can be increased by 60%-100% for varying Lognormal conditions (correlated Lognormal to non-correlated Lognormal). Since the interference is closely controlled, the C/I value can be estimated with a greater accuracy. This greater accuracy of C/I estimation may be seen to increase the capacity further.

According to preliminary results, use of aspects of the present invention may be seen to reduce C/I estimation error by 3 dB over previously known scheduling schemes. As such, it may be considered that use of aspects of the present invention may increase the coverage of a given base station 102 significantly, e.g., greater than 200% over Round Robin Equal Time Slot (RRETS) Scheduling and may increase the number of mobiles 106 that can be supported by a given base station 102 by up to 100% for a given service rate.

As will be apparent to a person skilled in the art, mean signal level is used for AMC selection, which is usually the case for mobiles 106 with a moderate speed. For low speed and stationary mobiles, temporal fading can be exploited (for the desired signal) using the same interference control method.

Although operation of aspects of the present invention have been exemplified with two target interference metric threshold levels (H, L), it should be apparent to a person skilled in the art that a lack of sufficient dynamic range in mobile transmit power can be addressed by introducing more than two interference metric threshold levels, say four interference metric threshold levels (S, M, L, XL).

When establishing the interference metric threshold levels that make up the set of orthogonal base station target interference patterns, the interference metric threshold levels may be determined based on, for instance, known propagation conditions within a given sector or sector size. Propagation conditions (e.g., path loss variation) may be established for a given sector associated with a given base station using test drive measurements and simulations based on the test drive measurements (which may require pilot signal measurements associated with corresponding geographic positioning system information), as is known. The simulations using drive test data may consider maximum interference, the signal strength difference between the minimum path loss and the second lowest path loss. As discussed earlier, the base station target interference patterns may be established at the time of deployment or at the time of any other modification in the cellular network 100. In this manner, the power management and distributed scheduling methods representative of aspects of the invention may be considered to have an ongoing adaptability. Notably, due to different propagation conditions and sector size, the "H" interference metric threshold level at the first base station 102A may have a different value that the "H" interference metric threshold level at the second base station 102B.

If loading is different for different time slot target interference patterns, the proportion of time slots associated with a particular time slot target interference pattern can be increased in a network-wide manner. For instance, two time slots may be associated with the (H, H, H, H) time slot target interference pattern. A given time slot associated with a given time slot target interference pattern may be considered loaded when potential interference profiles associated with more than one mobile 106 routinely correlate highly with the given time slot target interference pattern. That is, more than one mobile 106 routinely requires use of the given time slot.

The demand for the same time slot by more than one mobile 106 may, as will be apparent to a person of ordinary skill in this art, be satisfied to some extent through the use of orthogonal frequency division multiplexing.

In operation, a base station 102 may determine that, in a scheduling time frame, such as the exemplary 16-time-slot scheduling time frame, having a different time slot target interference pattern for each time slot, the time slot associated with the (H, H, H, H) time slot target interference pattern is heavily loaded. Responsive to determining this loading of a particular time slot, the establish a new 17-time-slot scheduling time frame, having a two time slots associated with the (H, H, H, H) time slot target interference pattern. As it is important that all base stations schedule based on the same timing, before implementing the new 17-time-slot scheduling time frame, the base station. 102 may communication the new 17-time-slot scheduling time frame to each of the base stations 102 in the cellular network 100 of FIG. 1, perhaps along with an indication of a time for implementing the new 17-time-slot scheduling time frame.

Alternatively, the scheduling time frame may remain 16-time-slots long and have two time slots associated with the (H, H, H, H) time slot target interference pattern, where the second time slot associated with the (H, H, H, H) time slot target interference pattern replaces a time slot, with a lesser load, associated with another time slot target interference pattern.

Additionally, a load balancing scheme can further increase the capacity for equal throughput (EQT) requirements. In EQT system, mobiles may experience the same throughput irrespective of location, as long as the mobiles are running the same application and have same amount of data to be sent.

Figure 7:
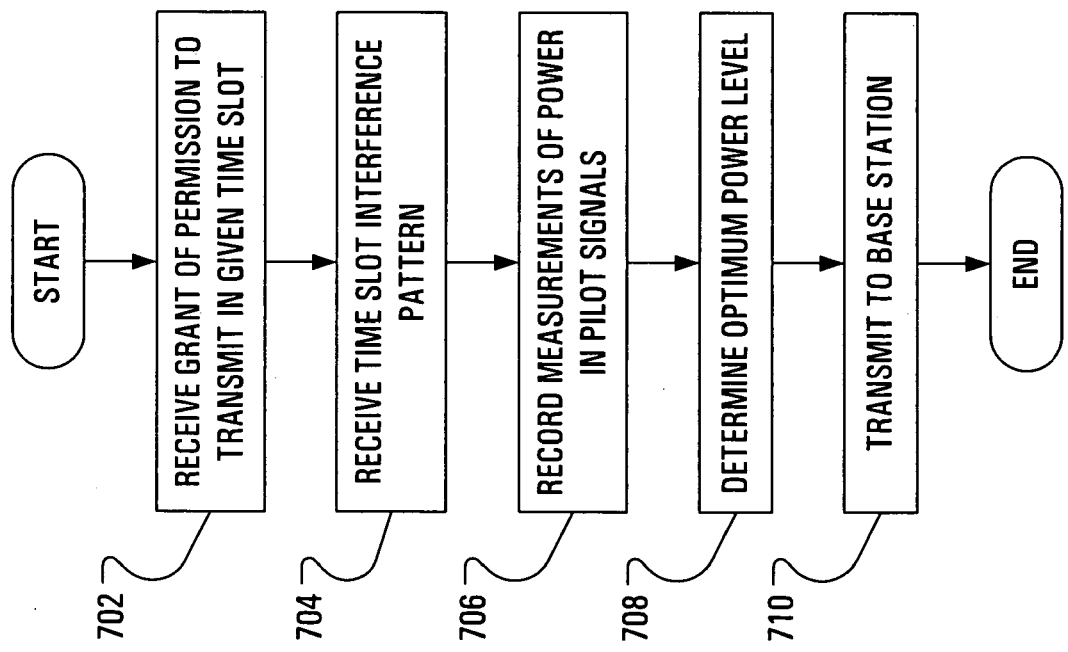
FIG. 7 illustrates steps in a power management method for execution by a mobile according to an embodiment of the present invention.

Although throughout the preceding, the optimum power level for uplink transmission is provided to the mobile 106 by the base station 102, the mobile 106 may be given enough information to determine an optimum power level for uplink transmission independently. As illustrated in FIG. 7, the mobile 106 may, for instance, receive a grant of permission (step 702) to transmit in a given time slot and receive (step 704) an indication of the interference metric threshold level associated at the base station 102 with the given time slot. As has been discussed, the mobile 106 records measurements (step 706) of received power in pilot signals from base stations in range. Based on the measurements of received power in the pilot signals received from the base station 102 and on the indication of the interference metric threshold level, the mobile 106 may determine (step 708) an optimum power level for transmission to the base station in the given time slot. The mobile 106 may then transmit to the base station 102 (step 710) using the optimum power level.

In a more complex arrangement, the mobile 106 may receive indications of the interference metric threshold level associated, at all in-range base stations 102, with the given time slot. That is, the mobile 106 may receive (step 704), perhaps from the base station with which the mobile is associated (the "connected" base station), an indication of the time slot target interference pattern for the given time slot. The mobile 106 may then determine (step 708) an optimum power level for transmission to the connected base station in the given time slot based on the time slot target interference pattern for the given time slot and power measurements (recorded at step 706) of pilot signal from all in-range base stations 102.

Other modifications will be apparent to those skilled in the art and, therefore, the invention is defined in the claims.

We claim:

1. At a given base station among a plurality of base stations in a wireless communication system, a method of managing uplink transmission power at a plurality of mobile devices, said method comprising:
    selecting a given time slot among a plurality of time slots in a scheduling time frame;
    determining an interference metric threshold level for said given base station for said given time slot;
    selecting a given mobile station among said plurality of mobile stations;
    receiving, from said given mobile station, an indication of a received power level of a pilot signal from said given base station;
    determining, from said interference metric threshold level and said indication of said received power level, an interference target threshold for said given mobile station; and
    transmitting, to said given mobile station:
        permission to transmit an uplink transmission to said given base station in said given time slot; and
        an indication of said interference target threshold, whereby a power for said uplink transmission is limited by said interference target threshold.

2. The method of claim 1 wherein said interference metric threshold level relates to an interference metric and said interference metric is rise over thermal.

3. The method of claim 1 further comprising:
    determining propagation conditions; and
    determining said interference metric threshold level based on said propagation conditions.

4. The method of claim 1 further comprising determining said interference metric threshold level based on a size of a sector served by said given base station.

5. The method of claim 1 further comprising:
    receiving an indication of quality of service requirements for said each mobile station; and
    wherein said selecting said given mobile station is further based, in part, on said quality of service requirements.

6. A given base station among a plurality of base stations in a wireless communication system including a plurality of mobile wireless communication devices, said given base station comprising:
    a scheduler for:
        select a given time slot among a plurality of time slots in a scheduling time frame;
        determine an interference metric threshold level for said given base station for said given time slot;
        select a given mobile station among said plurality of mobile stations;
        receive, from said given mobile station, an indication of a received power level of a pilot signal from said given base station; and
        determine, from said interference metric threshold level and said indication of said received power level, an interference target threshold for said given mobile station; and
    a transmitter for transmitting, to said given mobile station:

permission to transmit an uplink transmission to said given base station in said given time slot; and an indication of said interference target threshold, whereby a power for said uplink transmission is limited by said interference target threshold.

7. A computer readable medium containing computer-executable instructions that, when performed by processor in a scheduler at a given base station among a plurality of base stations in a wireless telecommunications system, cause said processor to:

select a given time slot among a plurality of time slots in a scheduling time frame;

determine an interference metric threshold level for said given base station for said given time slot;

select a given mobile station among said plurality of mobile stations;

receive, from said given mobile station, an indication of a received power level of a pilot signal from said given base station;

determine, from said interference metric threshold level and said indication of said received power level, an interference target threshold for said given mobile station; and transmit, to said given mobile station:

permission to transmit an uplink transmission to said given base station in said given time slot; and an indication of said interference target threshold, whereby a power for said uplink transmission is limited by said interference target threshold.

* * * * *